US012629630B2

(12) United States Patent
Pere et al.

(10) Patent No.: US 12,629,630 B2
(45) Date of Patent: May 19, 2026

(54) PROCESS AND APPARATUS FOR SEPARATING A MIXTURE OF HYDROGEN AND CARBON DIOXIDE

(71) Applicant: L'Air Liquide, Société Anonyme pour l'Etude et l'Exploitation des Procédés Georges Claude, Paris (FR)

(72) Inventors: Felix Pere, Paris (FR); Mathieu Leclerc, Paris (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 260 days.

(21) Appl. No.: 18/377,988

(22) Filed: Oct. 9, 2023

(65) Prior Publication Data

US 2024/0131470 A1      Apr. 25, 2024
US 2024/0226803 A9      Jul. 11, 2024

(30) Foreign Application Priority Data

Oct. 19, 2022    (FR) ...................................... 2210786

(51) Int. Cl.
| | |
|---|---|
| *F25J 3/00* | (2006.01) |
| *B01D 53/22* | (2006.01) |
| *F25J 3/06* | (2006.01) |

(52) U.S. Cl.
CPC ............ B01D 53/229 (2013.01); F25J 3/067 (2013.01); B01D 2257/504 (2013.01); *F25J 2205/80* (2013.01); *F25J 2230/30* (2013.01); *F25J 2245/02* (2013.01)

(58) Field of Classification Search
CPC .......... F25J 3/0266; F25J 3/067; F25J 3/0655; F25J 2205/80; F25J 2245/02; B01D 3/229
See application file for complete search history.

(56) References Cited

U.S. PATENT DOCUMENTS

| | | | | |
|---|---|---|---|---|
| 2008/0176174 | A1* | 7/2008 | White | ..................... F23L 7/007 431/115 |
| 2012/0121497 | A1 | 5/2012 | Terrien et al. | |
| 2012/0291481 | A1 | 11/2012 | Terrien et al. | |
| 2020/0307997 | A1 | 10/2020 | Tranier | |

FOREIGN PATENT DOCUMENTS

| | | |
|---|---|---|
| EP | 2 023 066 | 2/2009 |
| FR | 3 073 835 | 5/2019 |
| WO | WO 2012 064941 | 5/2012 |
| WO | WO 2012 158673 | 11/2012 |
| WO | WO 2022 131925 | 6/2022 |

OTHER PUBLICATIONS

French Search Report for corresponding FR 2210786, Jun. 17, 2023.

* cited by examiner

*Primary Examiner* — Brian M King

(74) *Attorney, Agent, or Firm* — Elwood L. Haynes

(57) ABSTRACT

In a process for separating a mixture containing hydrogen and carbon dioxide, the mixture is compressed to form a compressed mixture, the compressed mixture is separated by partial condensation and/or distillation generating a first CO2-depleted stream, the first CO2-depleted stream is separated by permeation through a membrane system to form a residue of the membrane system which is depleted in hydrogen and carbon dioxide and a portion of the residue is recycled, after expansion, to the compressor to be compressed therein.

4 Claims, 3 Drawing Sheets

PROCESS AND APPARATUS FOR SEPARATING A MIXTURE OF HYDROGEN AND CARBON DIOXIDE

CROSS REFERENCE TO RELATED APPLICATIONS

This application claims the benefit of priority under 35 U.S.C. § 119 (a) and (b) to French Patent Application No. 2210786, filed Oct. 19, 2022, the entire contents of which are incorporated herein by reference.

BACKGROUND

The present invention relates to a process and apparatus for separating a mixture of hydrogen and carbon dioxide, in particular a mixture also comprising at least one other component, such as carbon monoxide, methane or nitrogen. The mixture may optionally include water.

It has a particular advantage for such processes in which the mixture to be separated has previously been separated by adsorption, for example in H2 PSA, to produce a gas enriched in hydrogen and depleted in carbon dioxide and this mixture in gaseous form which is depleted in hydrogen and enriched in carbon dioxide compared to the gas treated in the adsorption.

For such processes equipped with turbines, the invention makes it possible to reduce the load of the separation process in a stable and efficient manner.

The adsorption process that produces the mixture to be separated often treats a gas from a reforming process such as a steam methane reformer known under the acronym SMR, an autothermal reformer known under the acronym ATR, or a partial oxidation known under the acronym POX.

WO2012/064938, WO2012/064941 and WO2012/158673 describe the separation, by permeation, of a flow of non-condensable gases from a low-temperature CO2 separation, involving the turbine expansion of a residue and the compression of a permeate.

SUMMARY

According to the invention, the process treats a gas, which may be the hydrogen-depleted waste gas from an adsorption process, for example of pressure swing type known under the acronym PSA. This gas can be compressed, dried, separated by partial condensation and/or distillation to produce a CO2-enriched fluid, wherein a waste gas of the partial condensation and/or distillation is separated by permeation through two membrane units.

According to one subject of the invention, a process is provided for separating a mixture containing hydrogen, carbon dioxide, and at least one component such as carbon monoxide, methane or nitrogen and optionally water, comprising the following steps:

a) compressing the mixture from a first pressure to a second pressure to form a compressed mixture, b) optionally drying the compressed mixture to form a dried mixture at the second pressure, c) separating the compressed and optionally dried mixture at the second pressure or at a third pressure higher than the second pressure by partial condensation and/or distillation generating at least one CO2-enriched product and a first CO2-depleted stream, d) separating, by permeation through a membrane system, the first CO2-depleted stream to form at least one permeate of the membrane system which is enriched in hydrogen and carbon dioxide and depleted in the at least one component relative to the first CO2-depleted stream and a residue of the membrane system which is depleted in hydrogen and carbon dioxide and enriched in the at least one component relative to the first CO2-depleted stream, e) expanding at least one portion of the residue in at least one turbine, characterized by the recycling of at least one portion of the residue from the at least one turbine to the compressor to be compressed therein, optionally after being mixed with the mixture at the first pressure at the inlet of the compressor.

The drying step is not necessary if the mixture does not contain water.

According to other optional aspects:

the membrane system comprises a first membrane unit and a second membrane unit and in which at least one portion of the first stream is sent to the first membrane unit to obtain a first permeate enriched in hydrogen and carbon dioxide and depleted in the at least one component relative to the first CO2-depleted stream and a first residue depleted in hydrogen and carbon dioxide and enriched in the at least one component relative to the first CO2-depleted stream, at least one portion of the first residue is sent to the second membrane unit to obtain a second permeate enriched in hydrogen and carbon dioxide and depleted in the at least one component relative to the first residue and a second residue depleted in hydrogen and carbon dioxide and enriched in the at least one component relative to the first residue, which is the residue from step e);

the residue is expanded in two turbines in series;

another portion of the residue from the at least one turbine is sent to regenerate the unit in which the drying of the compressed mixture of step b) takes place;

the permeate is compressed in one or more boosters, in which the first permeate and/or the second permeate is/are compressed in one or more boosters.

According to another subject of the invention, a process is provided for separating a mixture containing predominantly hydrogen, carbon dioxide, and at least one component such as carbon monoxide, methane or nitrogen and optionally water, operating according to two modes of operation and which, for both modes, comprises the following steps:

a) compressing the mixture from a first pressure to a second pressure to form a compressed mixture, b) optionally drying the compressed mixture to form a dried mixture at the second pressure, c) separating the compressed and optionally dried mixture at the second pressure or at a third pressure higher than the second pressure by partial condensation and/or distillation generating at least one CO2-enriched product and a first CO2-depleted stream, d) separating, by permeation through a membrane system, the first CO2-depleted stream to form at least one permeate of the membrane system which is enriched in hydrogen and carbon dioxide and depleted in the at least one component relative to the first CO2-depleted stream and a residue of the membrane system which is depleted in hydrogen and carbon dioxide and enriched in the at least one component relative to the first CO2-depleted stream, e) expanding at least one portion of the residue in at least one turbine, characterized in that according to a first mode of operation in which the flow rate of the mixture sent to the compressor has a first value, no portion of the residue from the at least one turbine is sent to the compressor and according to a second mode of opera-
tion in which the flow rate of the mixture sent to the
compressor has a second value lower than the first
value, a portion of the residue from the at least one
turbine is recycled to the compressor to be compressed
with the mixture at the first pressure.

According to other optional aspects:

during the second mode, a portion of the first stream is
sent to the inlet of the at least one turbine without
having treated it in the membrane system;

during the second mode, no portion of the first stream is
sent to the inlet of the at least one turbine without
having treated it in the membrane system;

during the first mode, no portion of the first stream is sent
to the inlet of the at least one turbine without having
treated it in the membrane system.

According to another aspect of the invention, a process is
provided for separating a mixture containing hydrogen,
carbon dioxide, and at least one component such as carbon
monoxide, methane or nitrogen and also optionally water,
comprising a compressor for compressing the mixture from
a first pressure to a second pressure to form a compressed
mixture, optionally a drying unit for drying the compressed
mixture to form a dried mixture at the second pressure, a unit
for separation by partial condensation and/or distillation for
separating the compressed and optionally dried mixture at
the second pressure or at a third pressure higher than the
second pressure to form at least one CO2-enriched product
and a first CO2-depleted stream, a membrane system for
separating, by permeation, the first CO2-depleted stream to
form at least one permeate of the membrane system which
is enriched in hydrogen and carbon dioxide and depleted in
the at least one component relative to the first CO2-depleted
stream and a residue of the membrane system which is
depleted in hydrogen and carbon dioxide and enriched in the
at least one component relative to the first CO2-depleted
stream, at least one turbine for expanding at least one portion
of the residue, characterized in that it comprises a line
connected to the outlet of the at least one turbine to send at
least one portion of the residue to the inlet of the compressor
to compress it in the compressor.

The apparatus may comprise means for measuring or
deducing the flow rate of mixture sent to the compressor and
means for opening the line connected to the outlet of the at
least one turbine to send at least one portion of the residue
to the inlet of the compressor depending on the flow rate of
mixture sent to the compressor.

BRIEF DESCRIPTION OF THE DRAWINGS

For a further understanding of the nature and objects for
the present invention, reference should be made to the
following detailed description, taken in conjunction with the
accompanying drawings, in which like elements are given
the same or analogous reference numbers and wherein.

DETAILED DESCRIPTION OF PREFERRED EMBODIMENTS

Figure 1:
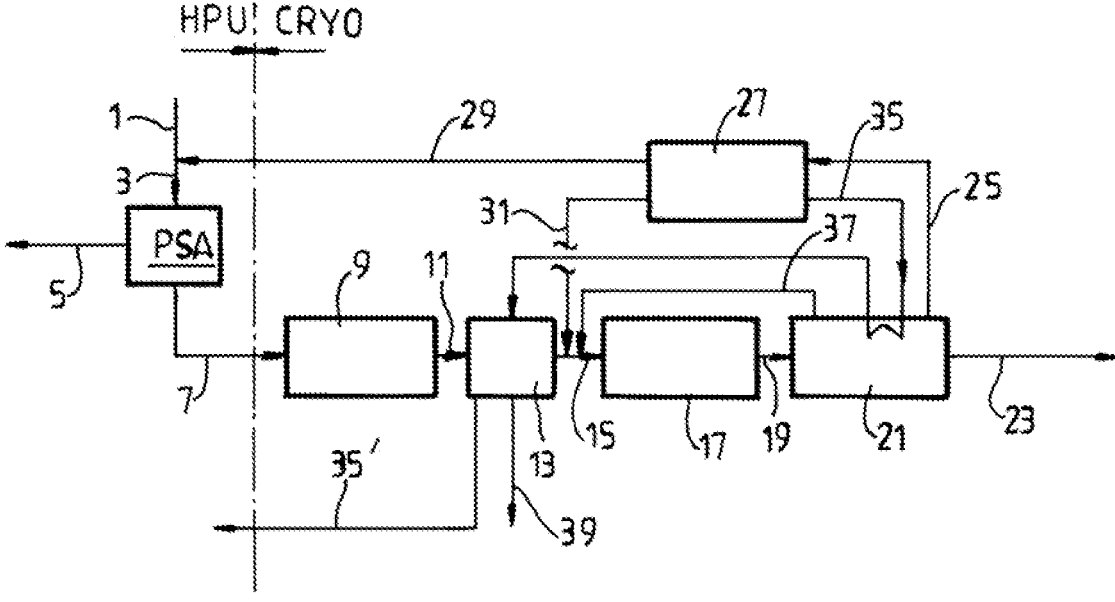
FIG. 1 shows a synthesis gas treatment process in which
the process according to the invention is integrated, here
showing the operation with a nominal flow rate.

FIG. 1 shows a process for treating synthesis gas 1
originating for example from an SMR, an ATR or a PDX.
This gas contains hydrogen and carbon dioxide and at least
one other component, such as carbon monoxide, methane or
nitrogen.

The gas 1 is separated by pressure swing adsorption in a
PSA unit forming part of the hydrogen production unit HPU.
The unit produces a gas 5 enriched in hydrogen and depleted
in carbon dioxide and also a gas 7 depleted in hydrogen and
enriched in carbon dioxide that also contains at least one
other component, such as carbon monoxide, methane or
nitrogen. The gas 7 may for example comprise 40-60 mol %
CO2, and also water, H2, CO, CH4 and N2.

The gas 7 is compressed in a compressor 9, the com-
pressed gas 11 is optionally dried in a drying unit 13
producing condensates 39 and the optionally dried gas 15 is
again compressed by a compressor 17 producing a com-
pressed gas 19. This second compression is optional and if
the gas 7 is dry, the drying is also optional. The compressed
gas is cooled and then separated by partial condensation
and/or by distillation to produce a liquid or gas 23 rich in
carbon dioxide, containing for example 99 mol % CO2. The
partial condensation and/or distillation process 21 also pro-
duces a gas 25 depleted in CO2 relative to the gas 19 but that
contains carbon dioxide and most of the hydrogen, nitrogen,
carbon monoxide and methane present in the gas 19. The
process 21 can also produce a gas 37 depleted in CO2
relative to the gas 19 which is at a lower pressure than the
gas 25. The gas 37 is recycled upstream of the compressor
17.

The gas 25 is separated by permeation through two
membrane units in series in an apparatus 27. This apparatus
produces:

A hydrogen-rich gas 29 containing between 65 and 85
mol % of hydrogen which is recycled to the PSA unit
to be separated, for example by mixing it with the
synthesis gas 1.

A CO2-enriched gas 31 which is recycled to the inlet of
the compressor 17, for example by being mixed with
the flow 15.

A gas 35, 35' enriched in N2, CO and CH4, containing
little CO2 and H2 (in total less than 10 mol %) that can
be used as fuel.

The gas 35 is used in its entirety to regenerate the drying
unit 13 and then as a flow 35' is sent to the unit that produces
the gas 1 (for example SMR, ATR, PDX) to be burned to
provide heat to the reaction that takes place in the unit or to
serve as feed gas for the reaction.

To make the separation by permeation more efficient,
turbines coupled to compressors are used, the compressors
being used to compress the gas 29 in order to reduce its
permeation pressure. The turbines expand a residue from the
membrane separation which is the gas 35 and supply cold to
the separation by partial condensation and/or distillation in
the separation apparatus 21.

The process according to the invention can make it
possible to recover more than 97% of the CO2 and more
than 99% of the hydrogen present in the synthesis gas
feeding the adsorption unit, whereas a PSA typically recov-
ers 88-90% of the hydrogen in the synthesis gas.

FIG. 1 shows a method according to the invention operating according to a first mode in which the flow 7 sent to the compressor 9 is a nominal flow.

Figure 2:
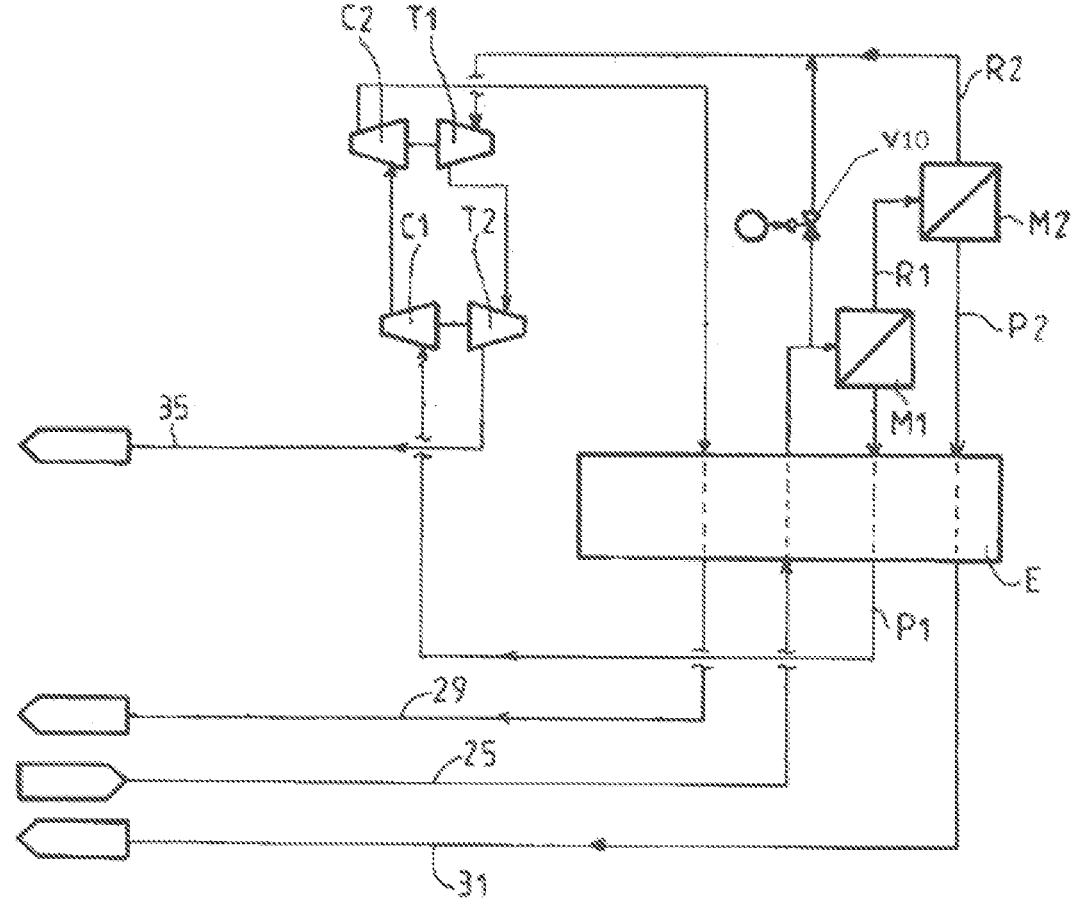
FIG. 2 shows in more detail the separation by membrane
units according to an example that can be used in a process
according to the invention.

FIG. 2 shows a process that can be used to separate the flow 25 from FIG. 1 by permeation. It will be understood that other processes can be substituted therefor, in particular processes that use a single turbine to expand the gas 35. The gas 25 originates from the separation by partial condensation and/or distillation 21 and has thus been purified to remove carbon dioxide. It contains hydrogen, carbon dioxide and at least one other compound, preferably carbon monoxide and/or methane and/or nitrogen, and is heated in a heat exchanger E, typically to a temperature between 70° C. and 90° C., and sent to a first membrane unit M1. The gas 25 is separated by permeation of the flow through the first membrane unit M1 to obtain a first permeate P1 enriched in hydrogen and carbon dioxide and depleted in the at least one component relative to the gas 25 and a first residue R1 depleted in hydrogen and carbon dioxide and enriched in the at least one component relative to the gas 25.

The first residue R1 is separated by permeation through a second membrane unit M2 to obtain a second permeate P2 enriched in hydrogen and carbon dioxide and depleted in the at least one component relative to the first residue R1 and a second residue R2 depleted in hydrogen and carbon dioxide and enriched in the at least one component relative to the first residue R1.

The first permeate P1 is compressed by two boosters in series C1, C2 and sent to the exchanger E to cool before being sent to be separated by adsorption in the PSA unit as gas 29.

The second permeate P2 is cooled in the exchanger E and recycled to the compressor as flow 31 to be separated again by partial condensation and/or distillation thereafter.

The second residue is expanded in two turbines in series T1, T2, is not sent to the exchanger E but leaves as gas 35 which is used first to regenerate the dryers 13 and then as gas 35' is sent to the synthesis gas production unit 1 either to produce heat by being burned in the burners or to participate in the chemical reaction.

If the process is operating at full load, the valve V10 connecting the inlet of the first membrane unit with the inlet of the turbine T1 will be closed.

The boosters C1, C2 are here coupled to the turbines T1, T2 respectively.

A process with a single expansion turbine can replace the process from FIG. 2. A process with one or more turbine(s) coupled to booster(s) can also replace the process from FIG. 2.

It will also be understood that the membrane system may comprise a single membrane unit producing a single permeate enriched in carbon dioxide and hydrogen and depleted in the at least one other component and a single residue enriched in the at least one other component and depleted in de dioxide carbon and hydrogen.

According to the process, the at least one turbine T1, T2 is fed by the residue R2 of a membrane unit M2 which is the second of two membrane units in series M1, M2. The flow rate of the at least one turbine depends on the flow rate sent to the first of the two membrane units and also on the surface area of the installed membranes. When the load of the membrane units is reduced, the flow rate at the inlet of the membrane units is reduced proportionally (the performance of the distillation and/or partial condensation section are almost independent of the load).

Since the surface area of the membranes is constant, the proportion of the gas to be separated that permeates increases with the flow rate of the gas to be separated in the membrane unit. Thus the residue flow rate reduces faster than the feed flow rate. For example, at a load of 85% of the nominal, the residue flow rate will be 80%.

This has a direct impact on the turbines T1, T2, as the speed of the machines is directly correlated with the flow rate expanded in the turbine. Insufficient speeds can result in machine instability, poor operability, and ultimately damage. Note that the order of magnitude of the minimum variation at which the turboexpanders can safely operate is approximately 80%.

One solution to this problem may be to send gas to be separated 25 directly to the at least one turbine T1, T2, without separating it in the membrane units M1, M2. In this way, the flow rate to be expanded can be regulated and consequently the turbine can be protected and operate with a flow rate which does not pose a safety problem.

However, by passing the gas to be separated directly to the turbine or turbines, the overall efficiency of the separation by permeation is reduced by sending gases that have not been purified by the membrane units to the network of gas produced by the separation. Moreover, by sending gas to be separated directly to the turbines, the flow rate treated by the membrane units is further reduced, which membrane units receive less gas to be separated and thus the residue of the second membrane unit is further reduced. The fraction 25' of gas to be treated sent directly to the turbines must be large enough to maintain the flow rates to be expanded, which further reduces the efficiency of the process.

Another problem is that the composition of the expanded gas is modified by sending gas to be treated directly to the turbine or turbines since the content of hydrogen and CO2 will increase significantly. Thus, the turbine or turbines must be designed to expand highly variable compositions.

Figure 3:
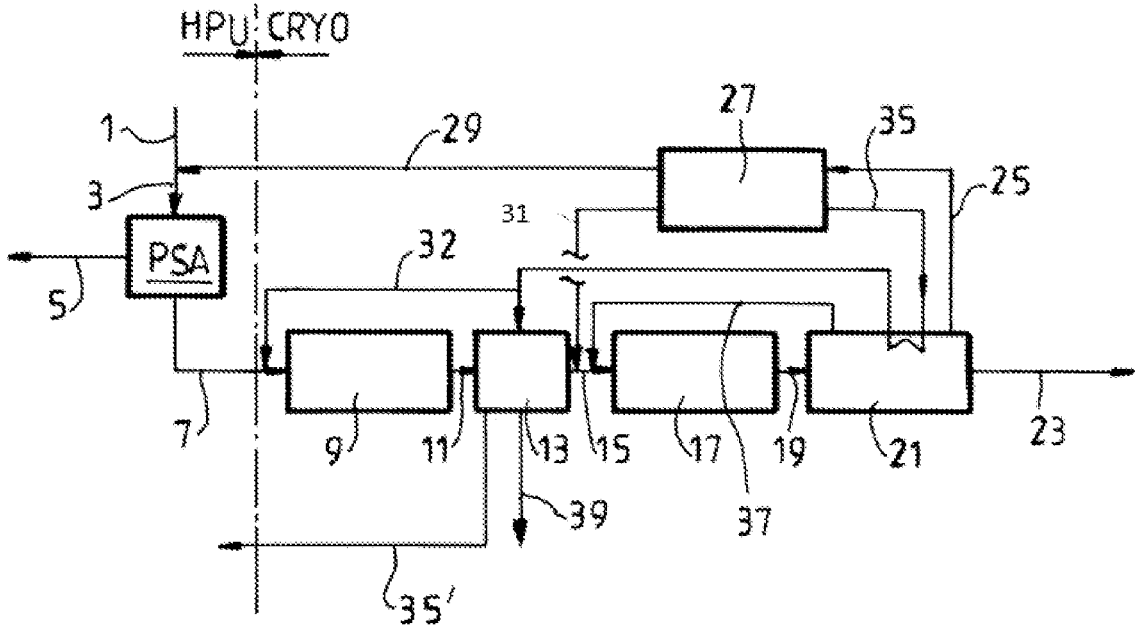
FIG. 3 shows a synthesis gas treatment process in which
the process according to the invention is integrated, here
showing the operation with a reduced flow rate.

The solution according to the invention will now be described with reference to FIG. 3 which shows the process from FIG. 1 operating at reduced load.

The membrane units M1, M2 allow different species to penetrate differently. The "fastest" molecules permeate first, and the "slowest" molecules permeate less. A membrane thus creates a stream enriched in "fast" species and a stream depleted in these species.

For the membranes used in a process according to the invention, the fastest molecules are H2 and CO2, and the slowest are CH4, CO and N2. Theoretically, for a given membrane area, a stream with a higher content of CO, N2 and CH4 will generate a higher residue flow rate than a stream with a higher content of H2 and CO2.

Therefore, it would be advantageous for the turbines to enrich the feed gas 25 with N2, CO and CH4, as more residue R2 would be available and it would be less necessary to send gas to be treated directly to the turbine.

Fortunately, not all the gas 35 needs to be used for the regeneration of the dryers 13 when operating at low load. Indeed, the expanded flow is optionally kept constant by opening the valve V10 and sending a portion 25' of the flow to be separated directly to the turbines, without passing through the membrane units, whereas the flow required for regeneration of the dryers 13 is approximately proportional to the unit load. As the unit load decreases, an increasing portion 32 of the gas 35 is available for uses other than the regeneration of the dryers 13 (if present). Moreover, the dryers 13 can be regenerated by another gas present on the site and thus all the gas 35 can be sent to the compressor 9 to be compressed.

This portion 32 of the gas 35 can be recycled to the inlet of the treatment unit to be compressed in a compressor 9 upstream of the dryers with the gas 7 from the PSA adsorption.

Preferably, sending the flow 32 upstream of the compressor is triggered by a flow meter which measures the flow rate 1 and/or the flow rate 3 and/or the flow rate 7 and allows the flow 32 to be sent only if the flow rate 1 and/or the flow rate 3 and/or the flow rate 7 is (are) below a threshold. The apparatus thus comprises means for measuring or deducing the flow rate of mixture 7 sent to the compressor 9 and means for opening the line connected to the outlet of the at least one turbine T2 to send at least one portion 32 of the residue to the inlet of the compressor 9 depending on the flow rate of mixture 7 sent to the compressor 9.

The flow rate 32 can therefore be regulated in order to compensate for a drop in the flow rate 7 so that the compressor 9 compresses a constant flow rate.

The process has several advantages:

The loss of membrane performance increases the residual H2 and CO2 content of the fuel gas. Recycling a fraction of this stream partially compensates for the drop in performance, as the CO2 and H2 will be partially separated and recovered in the cryogenic and membrane sections.

Since the unit is at very low load, the compressor of the exhaust gas must operate on the recycling thereof. The additional recycling of the fuel gas therefore has no impact on the energy consumption of the unit.

Since the fuel gas 35 is rich in N2, CO and CH4, compounds with the slowest permeation, this recycling increases the residue flow rate even more, and thus limits, or even eliminates, the need to divert a portion of the gas to be treated without passing through the membrane units in order to feed the turbines sufficiently. This further reduces the loss of performance.

Figure 4:
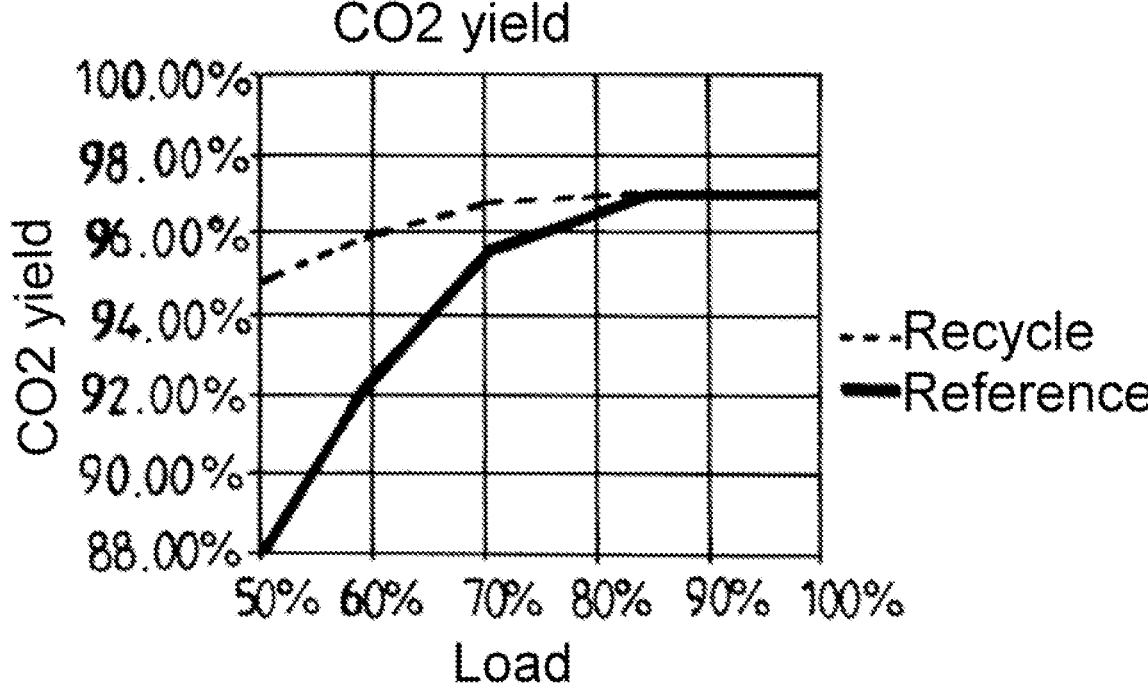
FIG. 4 shows the CO2 yield of a process according to the
invention (recycle) and of another process (reference)
Figure 5:
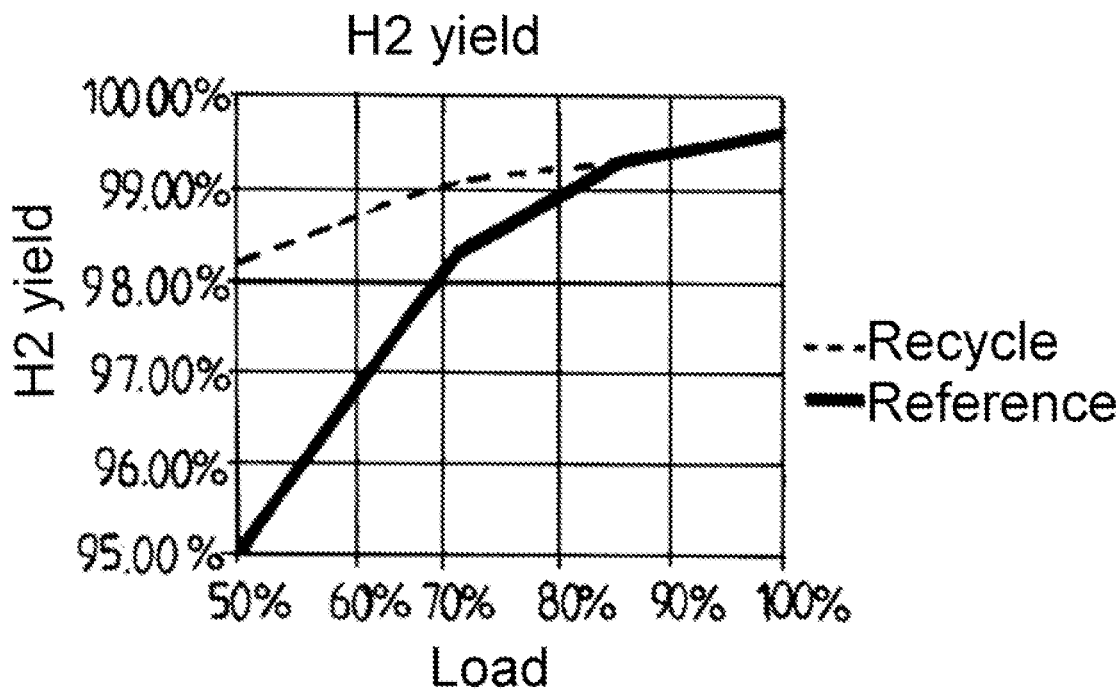
FIG. 5 shows the H2 yield of a process according to the
invention (recycle) and of another process (reference).

FIG. 4 compares performance losses for CO2 (CO2 yield) with the decrease in the load for both diagrams. FIG. 5 compares performance losses for H2 (H2 yield) with the decrease in the load for both diagrams. As can be seen, the recycling of the fuel gas stabilizes the performance, even at low load. The relative performance loss is marginal compared to what would be expected without this apparatus.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for separating a mixture containing hydrogen, carbon dioxide, and at least one component such as carbon monoxide, methane or nitrogen and water, comprising:
   a) compressing the mixture from a first pressure to a second pressure to form a compressed mixture in a compressor,
   b) drying the compressed mixture to form a dried mixture at the second pressure, c) separating the compressed and dried mixture at the second pressure or at a third pressure higher than the second pressure by partial condensation and/or distillation generating at least one CO2-enriched product and a first CO2-depleted stream,
   d) separating, by permeation through a membrane system, the first CO2-depleted stream to form at least one permeate of the membrane system which is enriched in hydrogen and carbon dioxide and depleted in the at least one component relative to the first CO2-depleted stream and a residue of the membrane system which is depleted in hydrogen and carbon dioxide and enriched in the at least one component relative to the first CO2-depleted stream,
   e) expanding at least one portion of the residue in at least one turbine,
   f) recycling of at least one portion of the residue from the at least one turbine to the compressor to be compressed therein.

2. The process according to claim 1, wherein the residue is expanded in two turbines in series.

3. The process according to claim 1, wherein another portion of the residue from the at least one turbine is sent to regenerate the unit in which the drying of the compressed mixture of step b) takes place.

4. A process for separating a mixture containing predominantly hydrogen, carbon dioxide, and at least one component such as carbon monoxide, methane or nitrogen and water, operating according to two modes of operation and which, for both modes, comprising:
   a) compressing the mixture (7) from a first pressure to a second pressure to form a compressed mixture in a compressor,
   b) drying the compressed mixture to form a dried mixture at the second pressure,
   c) separating the compressed and dried mixture at the second pressure or at a third pressure higher than the second pressure by partial condensation and/or distillation generating at least one CO2-enriched product and a first CO2-depleted stream,
   d) separating, by permeation through a membrane system, the first CO2-depleted stream to form at least one permeate of the membrane system which is enriched in hydrogen and carbon dioxide and depleted in the at least one component relative to the first CO2-depleted stream and a residue of the membrane system which is depleted in hydrogen and carbon dioxide and enriched in the at least one component relative to the first CO2-depleted stream,
   e) expanding at least one portion of the residue in at least one turbine, wherein according to a first mode of operation in which the flow rate of the mixture sent to the compressor has a first value, no portion of the residue from the at least one turbine is sent to the compressor and according to a second mode of operation in which the flow rate of the mixture sent to the compressor has a second value lower than the first value, a portion of the residue from the at least one turbine is recycled to the compressor to be compressed with the mixture at the first pressure.

* * * * *